United States Patent
Hause

[15] 3,690,398
[45] Sept. 12, 1972

[54] HYDROSTATIC DRIVE
[72] Inventor: Gilbert K. Hause, Bloomfield Hills, Mich.
[73] Assignee: General Motors Corporation, Detroit, Mich.
[22] Filed: Oct. 5, 1970
[21] Appl. No.: 77,941

[52] U.S. Cl. ............................................. 180/66 R
[51] Int. Cl. ............................................. B60k 17/10
[58] Field of Search .........180/66 R, 54 F, 57, 56, 55, 180/66 F, 65 F

[56] References Cited

UNITED STATES PATENTS

| 1,773,587 | 8/1930 | Lape | 180/66 R |
| 1,111,525 | 9/1914 | Coppock | 180/56 |
| 3,439,766 | 4/1969 | Dence et al. | 180/66 F |
| 3,273,464 | 9/1966 | Thurber | 180/66 F UX |

FOREIGN PATENTS OR APPLICATIONS

| 945,431 | 7/1956 | Germany | 180/66 F |
| 420,616 | 4/1947 | Italy | 180/66 A |

Primary Examiner—Benjamin Hersh
Assistant Examiner—Milton L. Smith
Attorney—W. E. Finken, A. M. Heiter and D. F. Scherer

[57] ABSTRACT

A vehicle suspension and hydrostatic drive system in which the driving engine, the fluid pump, the fluid motors and the driven wheels are suspended from the vehicle frame as a unitary package. The engine pump unit is connected to each motor unit by a truss having the upper and lower horizontal truss members formed by rigid fluid conduits and the end truss members formed by the pump and motor housings and intermediate diagonal truss members. The trusses are bowed so the center of weight of the engine pump unit and each motor unit are on a transverse axis. The fluid motors have a central spindle providing rotary support for the driven wheels. Single needle bearings located between each motor housing and the driven wheel provide thrust or axial support for the wheels.

2 Claims, 6 Drawing Figures

INVENTOR.
Gilbert K. Hause
BY
Donald F. Scheuer
ATTORNEY

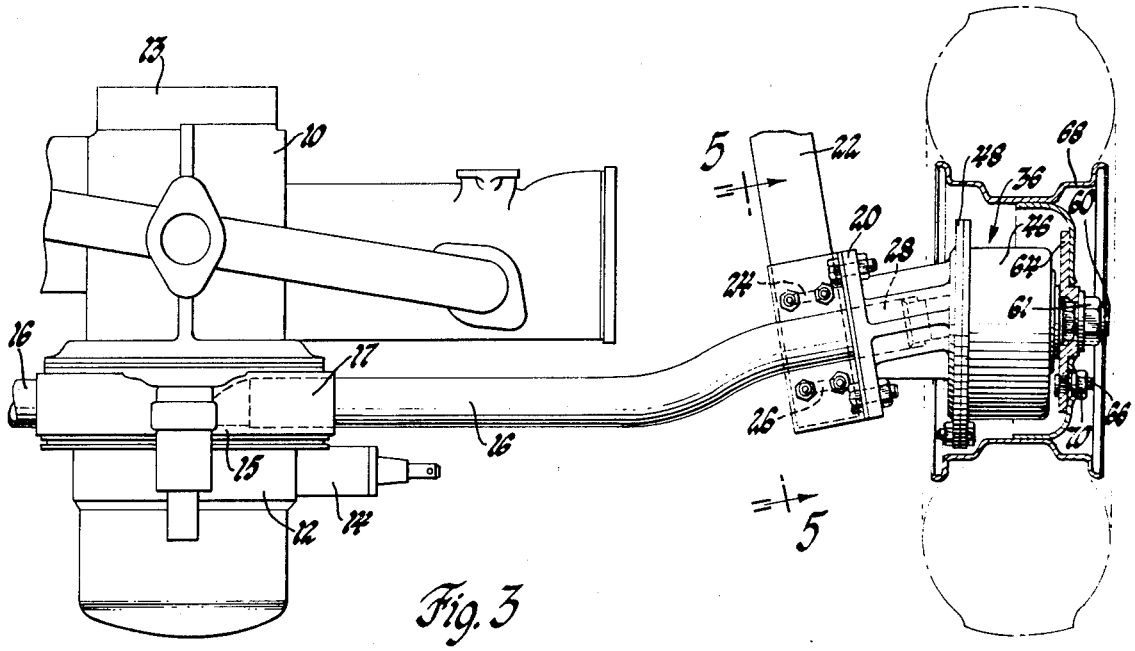
Fig. 3
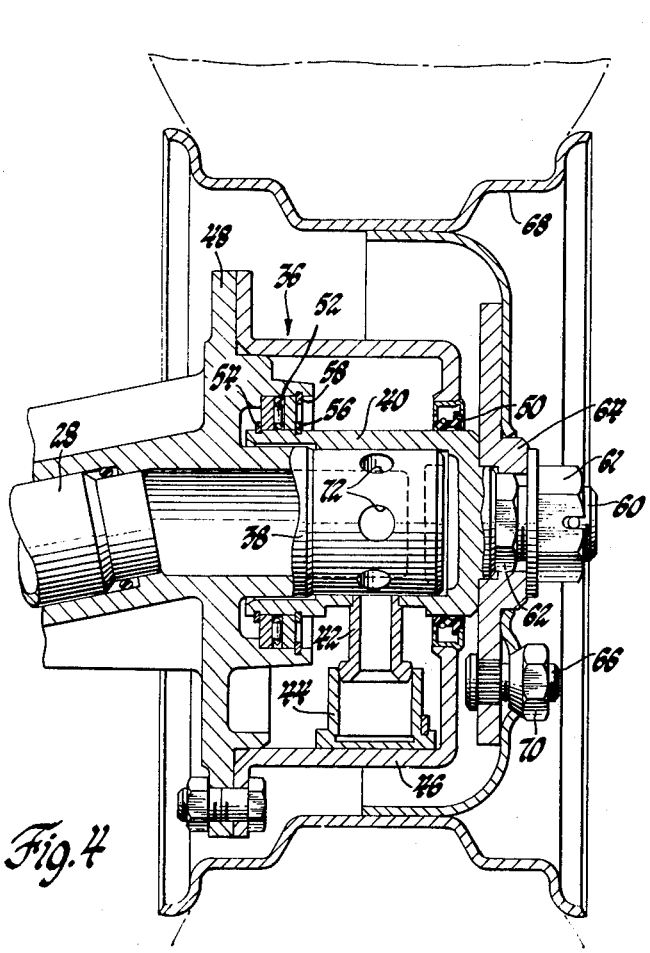
Fig. 4
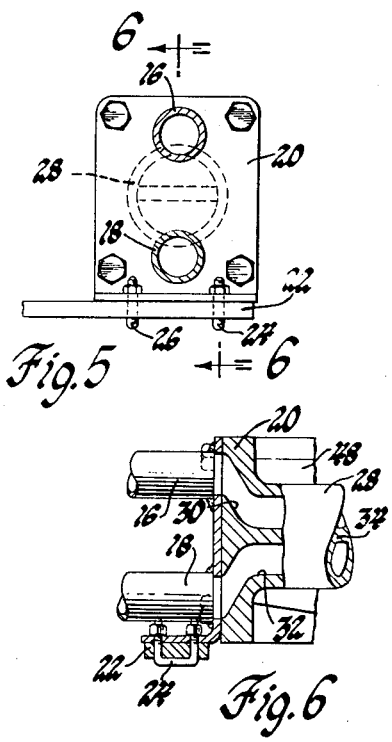
Fig. 5
Fig. 6
INVENTOR.
Gilbert K. Hause
BY Donald F. Scherer
ATTORNEY

HYDROSTATIC DRIVE

This invention relates to vehicle drive systems and more particularly to hydrostatic drive systems in which the drive components are suspended from the vehicle frame as a unitary package.

In the present invention, the driving engine and the fluid pump for the hydrostatic drive system are drivingly connected and secured together to form a single power unit. The fluid pump is fluidically connected to drive motors in each of the vehicle driving wheels by rigid conduits which conduct fluid from the pump to the motors to provide a drive for the vehicle. The conduits are suspended from the vehicle frame by a pair of springs. Thus, the entire drive package, engine, pump, motors and driving wheels are suspended as a unitary package from the vehicle frame.

Each fluid motor has a central spindle which rotatably supports the driving wheel. A needle bearing disposed between the housing of the fluid motor and the driving wheel provides axial or thrust support for the wheel on the spindle. This provides a simple support system for the driving wheel and eliminates the need of taper roller bearings presently used on most driving wheels.

The conduits form a rigid connection between the pump and motors and control the spacial relationship between the pump and the driving wheels. Leaf springs secured to the conduits and the vehicle frame maintain the position of the driving system relative to the vehicle. Therefore, the driving system including the pump and hydrostatic motors can move relative to the vehicle frame to absorb road shock and vibrations.

It is, therefore, an object of this invention to provide an improved vehicle suspension and drive system, an engine fluid pump, fluid motors and driving wheels connected in a unitary package and suspended from the vehicle frame.

Another object of this invention is to provide in an improved unitary drive package a fluid motor having a central spindle providing rotary support for a driving wheel and a single thrust bearing providing axial support.

These and other objects and advantages of the present invention will be more apparent from the following description and drawings in which:

FIG. 3 is a plan view of one-half of the drive system;

FIG. 4 is a cross-sectional view of the fluid motor and drive wheels;

FIG. 5 is a view taken along line 5—5 of 6—and

FIG. 6 is an elevational view partly in section taken along line 6—6 of FIG. 5.

Figure 1:
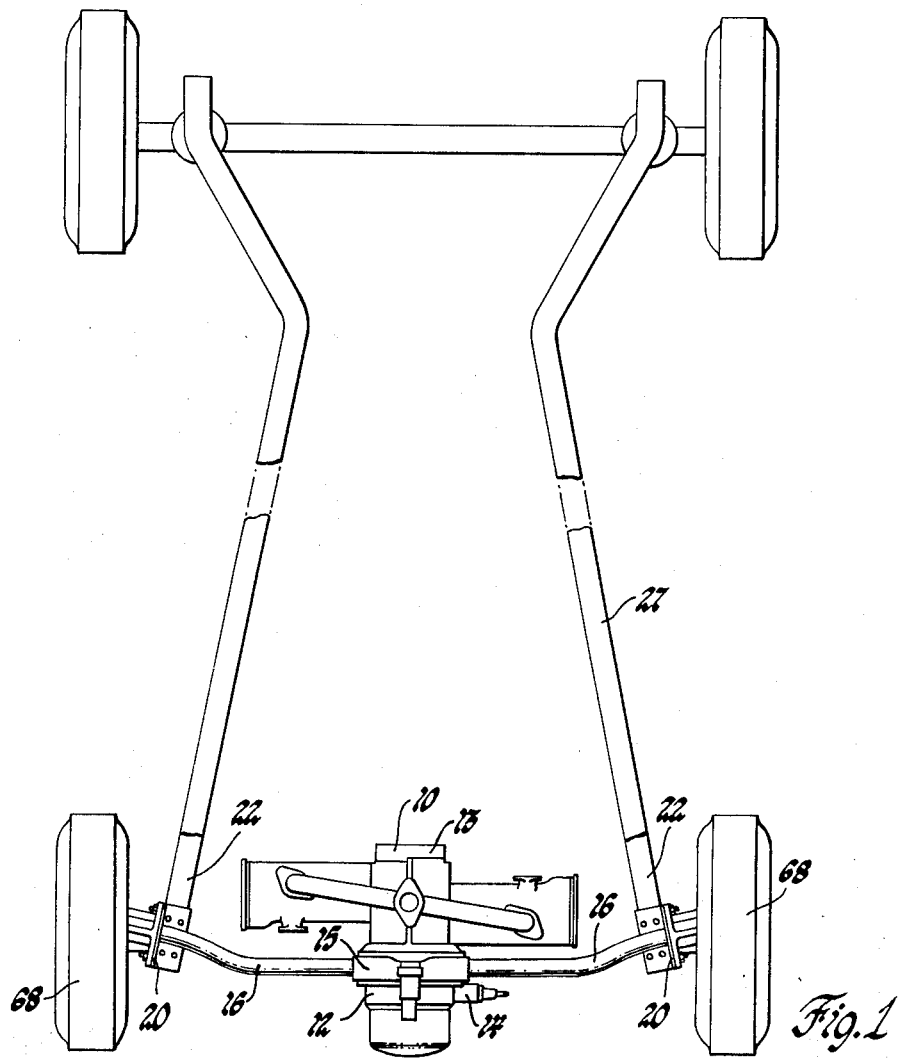
FIG. 1 is a plan view of the vehicle frame, drive and suspension.
Figure 2:
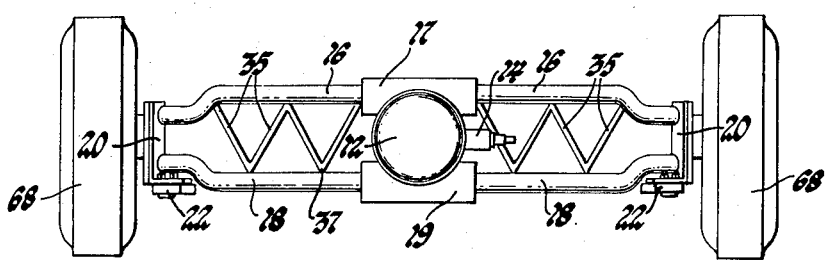
FIG. 2 is an end view of the vehicle drive and suspension system.

Referring to the drawings particularly FIGS. 1, 2 and 3 wherein like characters designate like or corresponding parts, there is shown an internal combustion engine 10 secured to and drivingly connected with a hydraulic pump 12. The engine 10 is a conventional internal combustion engine of the horizontally opposed piston type having a housing 13 and an output shaft, not shown. The pump 12 is a conventional variable displacement radial piston pump having a servo control 14 for controlling the displacement of the fluid pump and, therefore, the fluid delivered to the drive motors, a housing 15 and an input shaft, not shown, drivingly connected with the output shaft of the engine. The pump housing 15 is secured to the engine housing 13 and has a pair of vertically spaced fluid ports 17 and 19 connected to a pair of rigid conduits 16 and 18 respectively which are connected to mounting brackets 20 which are shackled to leaf springs 22 by U-bolts 24 and 26. The leaf springs 22 are also connected to the vehicle frame 27. Also connected to the bracket 20 is a rigid conduit 28 having a pair of fluid channels therein 30 and 32 separated by a central wall 34. The conduit 28 is in fluid communication with a fluid motor generally designated 36. The conduits 16 and 18 are secured together by a plurality of struts 35 to provide reinforcement to the structure. The pump housing 15 and the bracket 20 cooperate with the conduits 16 and 18 and the struts 35 to form a truss 37 having sufficient structural strength to support the engine 10, pump 12 and motors 36.

The fluid motor is a conventional radial piston motor having a central spindle 38 in fluid communication with the conduit 28, a sleeve member 40 rotatably mounted on the spindle 38, a plurality of pistons 42 secured to the sleeve 40 and slidably engaged in cylinders 44 which are slidably abutting the motor housing 46. The fluid channels 30 and 32 provide vertically spaced inlet and outlet ports for the motor 36 facing the pump ports 17 and 19. The motor housing 46 is secured to a drum 48 which is secured or formed integrally with the bracket 20. Thus, the housing 46 and the drum 48 are stationary. A lip seal 50 is disposed between the housing 46 and the sleeve 40 to prevent fluid from leaking to atmosphere past the end of sleeve 40. A thrust bearing such as needle bearing 52 is disposed between the drum 48 and the sleeve 40. The needle bearing 52 is positioned by a plurality of snap rings 54, 56 and 58, so as to permit relative rotation between the drum 48 and the sleeve 40 and also absorb the axial thrust loads that may be placed on the sleeve 40. The axis of the spindles 38 are aligned and lies in a plane containing the center of weight of the engine 10, pump 12, truss 37 and motor 36, thereby reducing the torsional stresses on the truss 37.

The sleeve 40 has a threaded end portion 60 and a hexagonal portion 62. The hexagonal portion 62 is adapted to mate with a drum 64 which is secured to the spindle 12 by a fastener 61. The drum 64 has a plurality of fasteners 66 secured thereto to permit mounting of a driving wheel 68 thereon. A plurality of fasteners 70 secure the driving wheel to the drum 64. Thus, when the sleeve 40 is rotated by fluid delivery to the motor 36, the driving wheel 68 will be rotated with the sleeve 40.

When the engine is rotating and therefore driving the fluid pump 12, fluid pressure is delivered through either conduit 16 or 18 to the fluid motor 36 depending upon the position of the servo valve 14. If fluid pressure is delivered through conduit 16, the fluid will pass through passage 30 to the fluid motor 36 where it will be delivered through openings 72 in the spindle 38 to the pistons 42 and cylinders 44. The fluid pressure in the pistons 42 and cylinders 44 will cause relative linear movement between the pistons and cylinders, thereby causing the sleeve 40 to rotate. As the sleeve 40, pistons 42 and cylinders 44 rotate, the fluid will be delivered from the cylinders 44 through the passage 32 and the conduit 18 to the pump 12. If it is desired to rotate the motor in the opposite direction, the servo 14 is adjusted by the operator so that fluid pressure is delivered through passage 18 to the motor 36 and returns to the pump 12 through passage 16.

Obviously, many modifications and variations of the present invention are possible in light of the above features. It is, therefore, to be understood that within the scope of the appended claims, the invention may be practiced otherwise than is specifically described.

What is claimed is:

1. In a vehicle suspension and drive system, an engine; a fluid pump drivingly connected to said engine; a pair of driving wheels; fluid motor means drivingly connected to the driving wheels each motor means having spindle means for rotatably supporting said driving wheels and single thrust bearing means for axially supporting said driving wheels on said spindle means; fluid conduit means for providing fluid communication between said pump and motors and forming a portion of the suspension system for the vehicle including vertically spaced fluid conduits secured to said pump and each of said motors, and struts secured between said fluid conduits to form therewith a structural truss component in the suspension system, said fluid conduits being laterally bowed to locate the center of weight of said engine and pump on the axis of said spindle means; and spring means secured between the vehicle frame and said conduit means for suspending the engine, pump, motors, and drive wheels from the frame in a unitary package.

2. In a vehicle suspension and drive system, a vehicle frame, an engine having a housing and an output shaft; a fluid pump having an input shaft drivingly connected to said engine output shaft and having a housing rigidly secured to said engine housing and said pump housing having an oppositely facing horizontally extending pair of inlet ports and an oppositely facing horizontally extending pair of outlet ports with one pair of said ports at the extreme top and the other at the extreme bottom of said housing to provide a substantial vertical arc between said pairs of ports; a pair of fluid motor means having a housing having a bracket secured thereto having vertically spaced inlet and outlet ports each facing the pump outlet and inlet ports respectively on the adjacent side of the pump; a pair of vertically spaced horizontally extending rigid fluid conduits between said pump and each bracket connected between said pump outlet port and said bracket inlet port and between said pump inlet port and said bracket outlet port for providing fluid communication between said pump and motors and structurally secured to said pump housing and bracket providing upper and lower truss members and forming with said pump housing and bracket acting as end verticals of a truss portion of the suspension system for the vehicle between said pump and each motor; and spring means secured between the vehicle frame and a conduit adjacent each bracket for suspending the engine, pump and motors in a unitary package; a pair of driving wheels, each fluid motor drivingly connected to a driving wheel, each motor having a spindle for rotatably supporting a driving wheel and single thrust bearing means for axially supporting said driving wheel on said spindle means; said pair of fluid conduits being bowed laterally to locate the weight center of said engine pump unit on the axis of said spindles.

* * * * *

PO-1050
(5/69)

UNITED STATES PATENT OFFICE
CERTIFICATE OF CORRECTION

Patent No. __3,690,398__ Dated __September 12, 1972__

Inventor(s) __Gilbert K. Hause__

It is certified that error appears in the above-identified patent and that said Letters Patent are hereby corrected as shown below:

Column 1, line 54, "of 6-and" should read --of Figure 3-and--

Signed and sealed this 13th day of February 1973.

(SEAL)
Attest:

EDWARD M. FLETCHER, JR.
Attesting Officer

ROBERT GOTTSCHALK
Commissioner of Patents